(12) United States Patent
Connor et al.

(10) Patent No.: US 8,313,209 B2
(45) Date of Patent: Nov. 20, 2012

(54) FOUR-WAY POWER SOURCE FOR MULTIFUNCTION TOOL

(75) Inventors: Nicholas Connor, Solana Beach, CA (US); Dennis Bertken, Solana Beach, CA (US)

(73) Assignee: Life+Gear, Inc., Solana Beach, CA (US)

( * ) Notice: Subject to any disclaimer, the term of this patent is extended or adjusted under 35 U.S.C. 154(b) by 574 days.

(21) Appl. No.: 12/511,330

(22) Filed: Jul. 29, 2009

(65) Prior Publication Data

US 2010/0027249 A1 Feb. 4, 2010

Related U.S. Application Data

(60) Provisional application No. 61/085,361, filed on Jul. 31, 2008.

(51) Int. Cl.
*F21L 4/00* (2006.01)
(52) U.S. Cl. ......... 362/183; 362/192; 320/101; 320/103
(58) Field of Classification Search .................. 362/183, 362/192, 193; 320/101, 103
See application file for complete search history.

(56) References Cited

U.S. PATENT DOCUMENTS

| | | | | |
|---|---|---|---|---|
| 7,825,615 | B2 * | 11/2010 | Chen et al. | 318/139 |
| 2007/0285053 | A1 * | 12/2007 | Noguchi et al. | 320/114 |
| 2009/0147505 | A1 * | 6/2009 | Robinett | 362/183 |

\* cited by examiner

*Primary Examiner* — Stephen F Husar
(74) *Attorney, Agent, or Firm* — Marger Johnson & McCollom, P.C.

(57) ABSTRACT

A multi-power source is described that provides power through a single source—e.g. rechargeable batteries—whose charge is maintained through four or more different power sources. Examples of such power sources are taken from a group consisting of disposable batteries, mechanical energy as developed through a crank, solar power, an external DC source such as provided through a car battery connection, and an external AC input as from an in-wall outlet. The power source is used to power an emergency multifunction tool, such as a modular light source having a flashlight, lantern, siren, flasher, and radio functions powered from the multi-power source.

7 Claims, 2 Drawing Sheets

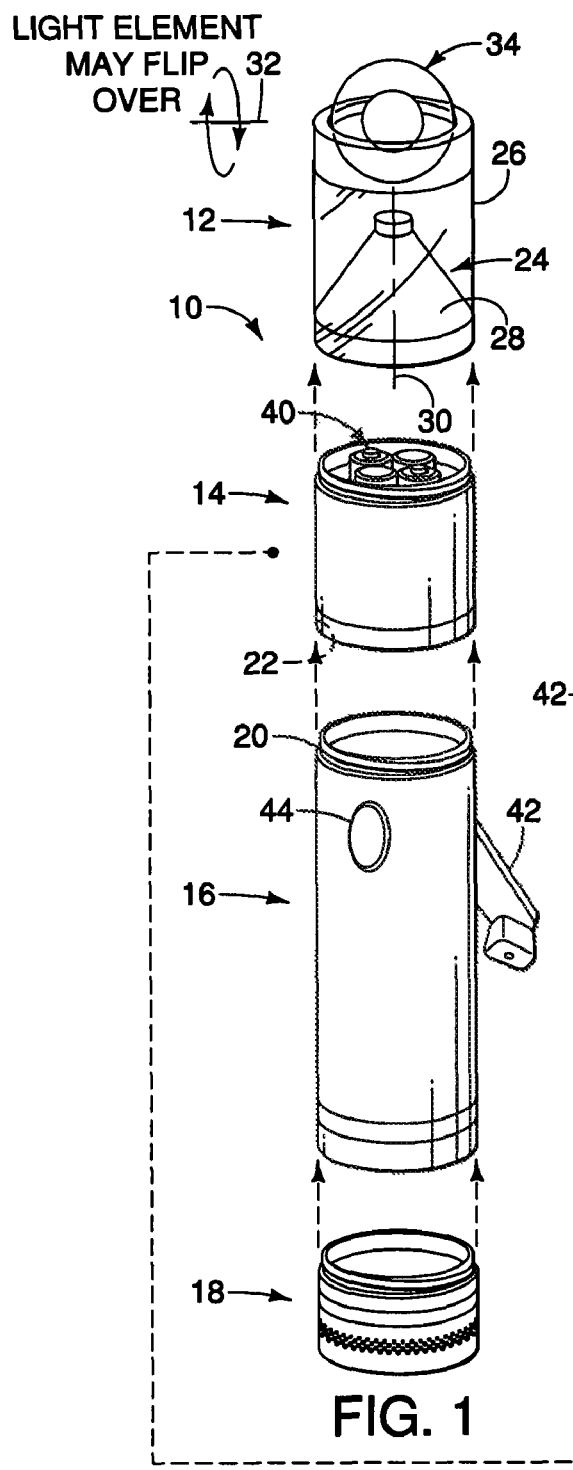
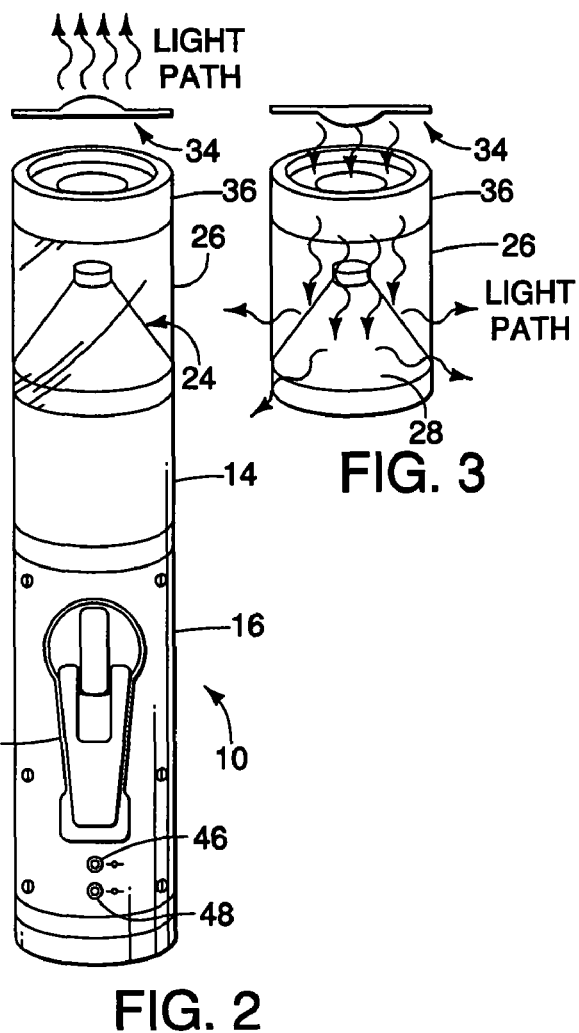
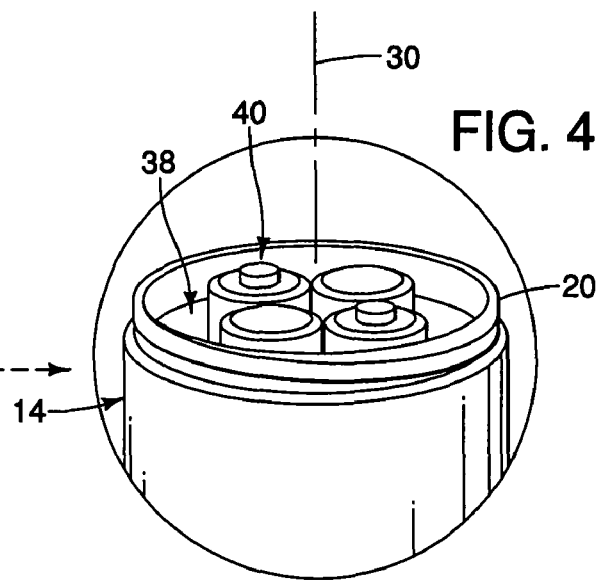

FOUR-WAY POWER SOURCE FOR MULTIFUNCTION TOOL

REFERENCE TO RELATED APPLICATIONS

This application claims the benefit of U.S. Provisional Application No. 61/085,361 filed Jul. 31, 2008, which is incorporated by reference.

BACKGROUND OF THE INVENTION

This invention relates generally to power sources and more particularly to such sources allowing for externally supplied AC, DC, internally generated electromechanical, and internal battery power sources for use with multifunction emergency tools and the like.

People often carry portable lights (such as flashlights, torches, and lanterns) for safety or recreational uses. Depending upon that day's activities, they may also carry a variety of small accessories. For example, people participating in outdoor sports or recreation may also carry accessories such as an AM/FM radio or MP3 player with a speaker, a storage unit, a GPS unit, a compass, a stopwatch or clock, or a pedometer.

In addition to these accessories, people concerned about emergency preparedness may also carry a radio that can access NOAA alerts or other weather channels, a first aid kit or other emergency accessories, a cell phone charger, or a two-way communication device. Moreover, any person using electronic accessories will also need to carry batteries, a solar collecting device, other power sources, or a manual power supply (such as a hand-crank power-generating device) for generating power or recharging batteries. In general, any portable light user may have a need for any or all of these and other accessories.

Murphy's law states that when something can go wrong, it will. Mechanical devices break down. Batteries become discharged. This is especially troubling for such devices as those noted above, since such devices are relied upon in emergency situations and thus need to work reliably.

Accordingly, the need remains for redundant power sources for use with emergency multifunction tools and the like.

SUMMARY OF THE INVENTION

The "quad-power" system of the current invention is specifically designed to assure that any "quad power" device will always be able to access electrical power. This feature provides tremendous utility when the user is not near conventional electrical power supply, but also provides potential life saving benefits during an emergency or disaster, where access to lighting or communication device is critical at a time when energy supply generally becomes compromised.

A multi-power source is described that provides power through a single source—e.g. rechargeable batteries—whose charge is maintained through four or more different power sources. Examples of such power sources are taken from a group consisting of disposable batteries, mechanical energy as developed through a crank, solar power, an external DC source such as provided through a car battery connection, and an external AC input as from an in-wall outlet. The power source is used to power an emergency multifunction tool, such as a modular light source having a flashlight, lantern, siren, flasher, and radio functions powered from the multi-power source.

In various representative aspects, the present invention describes a portable light-and-accessory aggregate along with methods of using such aggregates.

Exemplary implementations include a light source module attached to one or more power source modules and any combination of zero or more optional accessories, for example audio devices, storage devices, recreational devices, emergency items, or clocks.

The light-source module can be, for example, a lantern or a flashlight. Preferably, the light source module is a convertible lantern-flashlight. In one embodiment, the light source module has a reflective conical element mounted inside the module within a bottom portion thereof. The conical element reflective surfaces are upwardly facing toward a pivotable light source and angled at approximately 45°. The cylindrical walls of the module are made of a transparent material.

A light emitting element, including one or more LEDs, is pivotally mounted within at the top of the light source module so that it can be rotated to shine in one of two directions: upward or downward. The light emitting element includes the LED, a lens overtop the LED to focus or diffuse the light, and LED electronics to operate the LED in cooperation with the power source module. When pivoted so that the LED shines upward, the LED serves as a flashlight by emitting a beam of light from the light source module. When pivoted so that the LED shines downward, the LED light beams reflect off of the angled surfaces of the conical reflective element and then outward through the transparent wall of the lighting module. The lighting in this later arrangement is general in that light reflects radially in all lateral directions off of the upwardly conical surface for 360° illumination.

The invention further includes a power source module containing disposable batteries. The power source module may be attached to the underside of the light source module and acts alone or in cooperation with a secondary power source to power the light source module and any auxiliary modules that require power and are coupled in the aggregate with the other modules. The secondary power source may include a crank that a user can turn and parts for converting and storing the mechanical energy, such as rechargeable batteries. One embodiment of the invention may operate to power the light source module from the disposable batteries if the batteries are used as the sole power source. Alternately, the secondary/crank power source with rechargeable batteries may be used as the primary power source with the disposable batteries in the first power source module being used to charge the rechargeable batteries.

The foregoing and other objects, features and advantages of the invention will become more readily apparent from the following detailed description of a preferred embodiment of the invention that proceeds with reference to the accompanying drawings.

BRIEF DESCRIPTION OF THE DRAWINGS

FIG. 1 is an exploded, perspective view of the modular light source constructed according to one embodiment of the invention with the pivotally mounted lighting element shown in an intermediate position between a first (flashlight) and second (lantern) position.

FIG. 2 is an assembled, perspective view of the modular light source of FIG. 1 with the pivotally mounted lighting element disposed in a first, upward position to effect a flashlight function.

FIG. 3 is a partial perspective view of the modular light source of FIG. 1 with the pivotally mounted lighting element disposed in a second, downward position to effect a lantern function.

FIG. 4 is a magnified view of the power source module of FIG. 1 with disposable batteries installed per an embodiment of the invention.

DETAILED DESCRIPTION

Figure 5:
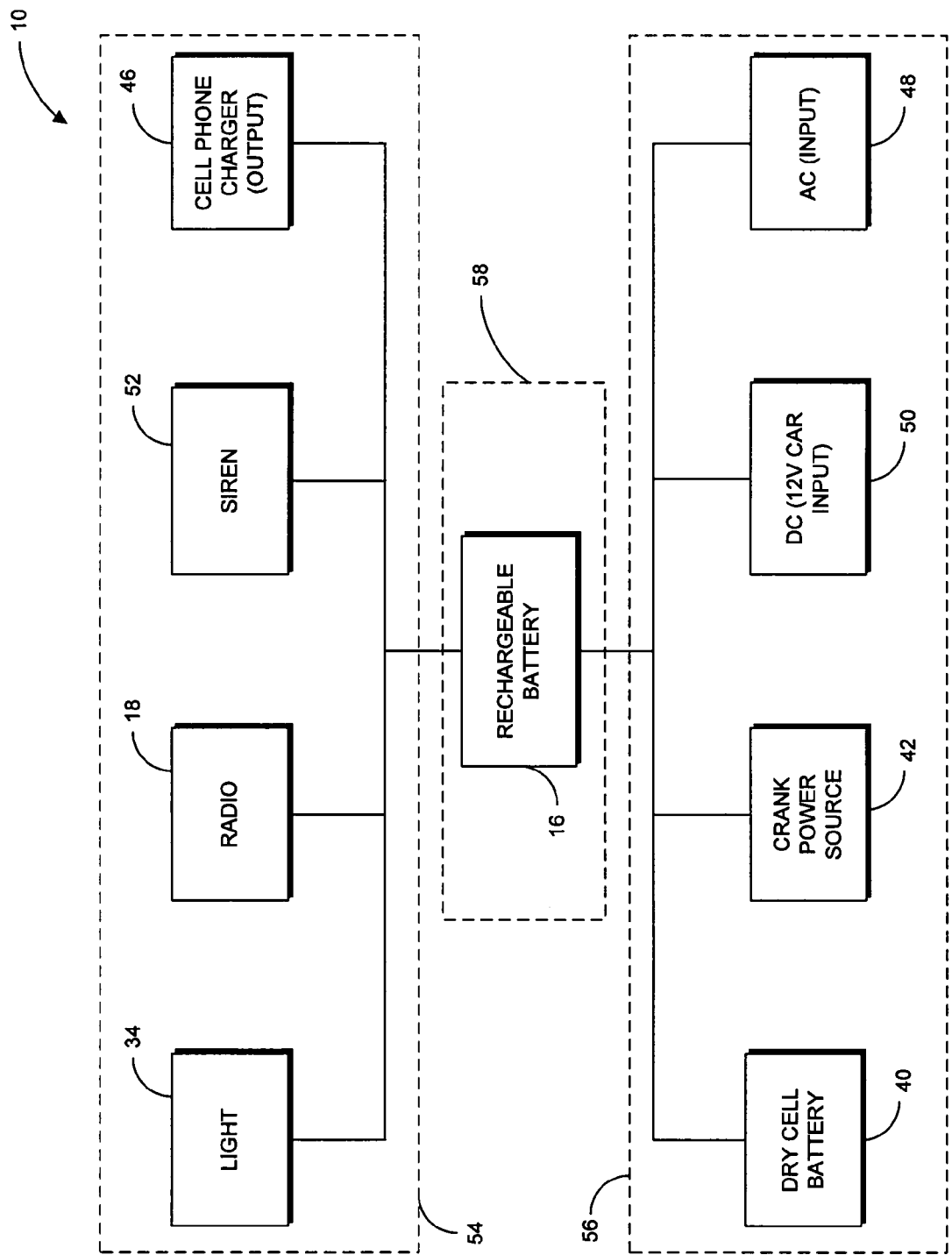
FIG. 5 is a block diagram displaying a preferred embodiment of a four-way power source implemented according to the invention.

Carrying a portable light and any or all of these and other accessories adds to the overall bulk of a person's belongings. Moreover, a person may bring some multiple accessories having the same feature. For example, a person may bring a clock/radio combination to tell time and an MP3/radio combination for listening to music. Carrying redundant accessories also adds to the bulk of the person's belongings.

The ability to make dual use of a portable light as a receptacle for attaching one or all of these and other accessories would be a significant advantage to portable light users, including users participating in recreational activities and sports and users concerned with emergency preparedness. It would, among other benefits, reduce the bulk, space, and weight of belongings, improve organization of accessories, and provide convenient access to a portable light and accessories. It would also reduce the amount of redundant accessories that add bulk to the person's belongings.

One approach to combining these elements in a modular design is disclosed in Applicant's prior application, U.S. Provisional Patent Application Ser. No. 60/981,806 ('806 application) called LIGHT SOURCE WITH MODULAR ACCESSORIES whose contents are incorporated herein for all purposes.

The '806 application discloses a light source module attached to a power source module and any combination of zero or more optional accessories, for example, audio devices, storage devices, recreational devices, emergency items, or clocks. The accessories can be attached in many combinations including but not limited to: light source module and power source module with an electronics module including a radio feature; or light source module, power source module, electronics module including a radio feature, and a storage compartment module. The storage compartment module can include a first-aid kit. The diameter of the portable light-and-accessory aggregate is, preferably, around two inches.

The '806 application further discloses that the light source module includes a conical reflective element with downward facing reflective walls and having a hollow passage in the center. One or more light elements (e.g. LEDs) are mounted below the hollow passage. In a first use, when the light source module is adapted for use as a flashlight, the LEDs are aligned with and shine directly through the hollow passage of the conical reflective element to form a beam of light. In a second use, when the light source module is adapted for use as a lantern for general lighting, the LEDs are misaligned with the hollow passage so that a majority of the light shines upward and reflects outward from the downward facing conical walls of the conical reflective element. In this way, the light is reflected laterally out the transparent cylindrical wall of the light source module in all directions to create general lighting in a radius around the lighting module rather than in a single beam projected from the lighting module.

LEDs are currently expensive, and multiple LEDs are desired to make the above design useful for general lighting in when used in a lantern function. Accordingly, the need remains for an alternate design that is more adaptable for use with a single LED for both flashlight and lantern functions.

FIG. 1 shows a perspective view of the modular light source stack 10 with different modules separated from one another in exploded form. The modular light source includes a light source module 12 at a top end of the light source 10, a first power source module 14, an alternate power source module 16, and an auxiliary module 18 at a bottom end of the modular light source stack 10. Each of the modules has a cylindrical form of approximately two inches in diameter.

Each of the modules includes set of female threads (not shown) defined within bottom portions of the modules. Each module, with the exception of the light source module 12 that is always located on the top of modular light source stack 10, also includes complementary male threaded portions defined on top portions of the module. An example of the male thread portion is shown at 20 on auxiliary power source module 16, which is adapted to couple to a female thread portion 22 on an above-placed first power source module 14.

Although screw coupling is shown in the drawings, there are a variety of techniques for attaching modules to one another without departing from the spirit of the invention. For example, a user could attach modules together in serial fashion by frictional engagement, snaps, or other types of fasteners. Furthermore, the modules can be coupled together in serial fashion and in any order to form stack 10.

The light-source module 10 includes a light-dispersal element, such as reflective conical element 24 enclosed within transparent cylindrical walls 26. The reflective conical element 24 is located within a lower portion of the light-source module 10 and includes upwardly-facing reflective surfaces 28 formed in a conical shape about a central axis 30 of the stack 10. The upwardly-facing surfaces 28 are preferably angled with respect to the central axis 30 at about 45° so that light projected vertically downward toward reflective surfaces is reflected radially outward and perpendicular to axis 30 for general lighting purposes.

The light-source module 10 further includes a light source element 34. In a preferred embodiment of the invention, the light source element 34 is pivotally mounted to an upper end of light-source module 10 along an axis 32 passing through a diameter of the light source element 34. The light source element 34 includes an LED, a lens, and driver electronics that cause the lighting element to illuminate in one direction depending upon how the element is pivoted. In a first direction (as shown in FIG. 2), the light source element 34 is pointed upward away from the reflective conical surface 24 so that the light source stack 10 acts as a flashlight. In a second direction (as shown in FIG. 3), the light source element 34 is pointed downward toward the reflective conical surface 24 so that the light source stack 10 acts as a lantern. An opaque annular ring 36 is fitted to the top of the cylindrical transparent wall 26 adjacent to the light source element 34 and acts to block and redirect any light spilling sideways from the light source element 34.

The power source module provides power to the light source module 12 and any or all electronic modules such as auxiliary/radio module 18. The power source module in the present embodiment as shown in FIGS. 1 and 2 include a first power module 14 and a supplemental power module 16. The first power module 14 includes a hollow compartment 38 (FIG. 4) into which are placed a set of batteries, such as disposable batteries 40. The supplemental power module 16 includes a hand-crank 42 and parts (not shown) for converting and storing the mechanical energy when the crank is manually turned by a user to charge up the supplemental power module 16 batteries (not shown). Such rechargeable batteries can be lithium, nickel cadmium, nickel hydride, or others known in the art.

A power button 44 is located on an outside wall of the supplemental power module 16. In one embodiment of operation, when a user clicks the button 44, power from the supplemental power source 16 is transmitted to the light source module 12 to operate the LED within light source element 34. When a user clicks the button 44 again, the light source element 34 can be driven to flash intermittently to serve as a safety or warning beacon. A third click would turn off the light source element 34 and the cycle starts over.

A button (not shown) may additionally be included on, or alternately included on, the first power module 14 so that the light source may be operated by batteries alone. In this way, the supplemental power module 16 need not be included so that the bulk of the modular device is reduced and disposable batteries alone are used to power the light source module 12 and/or any auxiliary module 18. In the preferred embodiment, however, with multiple redundant power sources, it is preferred that the supplemental power module 16 act as the power gatekeeper through which multiple power sources deliver power to the various tools.

Other power source modules are contemplated, including one that includes solar panels for converting and storing solar energy, a kinetic power source in which the system converts and stores the mechanical energy created from a user shaking or otherwise moving the module, or a combination of these possible types. The power source module 16 can also have power outlets for connecting a user's other electronic devices. For example, the power source module 16 can have a port 46 (FIG. 2) for powering or charging a user's mobile phone. The power source module may additionally include an AC/DC adaptor plug 48 so that the power source module 16 may be coupled to and charged by an AC power source. The power source module may additionally include a DC plug (50 in FIG. 5) through which battery power from a car may be transmitted to the device 10.

An auxiliary module 18 may be coupled to a bottom of the modular light stack 10 and include electronics or functions that may be added to the stack at the user's option. In the embodiment shown, the auxiliary module 18 includes an AM/FM radio with built-in speaker. Other types of auxiliary modules are contemplated, including an MP3 player, a storage unit, a GPS unit, a compass, a stopwatch or clock, and a pedometer. Each may be included within a single auxiliary module, or included on separate modules so that the functions can be added serially to the module light stack 10 as needed.

The features of the aggregates can be combined to address specific price points and market segments. These market segments include, among others, the general consumer portable light source market; the outdoor, recreational, and sports market; and the safety and emergency preparedness markets. For the emergency preparedness market, and aggregate can also include safety and emergency items inside a storage compartment module for access in case of an emergency. For the outdoor, recreational, and sports market, an aggregate can also include items commonly used for outdoor activity such as camping and hiking stored inside a storage compartment module. The items will be packaged with the aggregate light source and power source(s) and accessories as a complete solution to address specific markets.

Turning next to FIG. 5, illustrated for the exemplary modular lighting source 10 is a quad-power system used for powering multiple tools 54, such as light 34, radio 18, siren 52, and cell phone charger (output) 46. Light 34 is understood as described above to include a continuous flashlight, a lantern, a signal flasher, etc. In a preferred embodiment, all power-using implements receive energy from a central source 58 such as rechargeable battery 16. The rechargeable battery 16, in turn, receives power from multiple sources 56 such as from dry cell batteries 40, crank 42, a DC input 50 and an AC input 48. Crank 42 is exemplary of a self-powered source and can include alternately or additionally such technologies as solar panels, a dynamo, or internal generators. Alternately, the multiple power sources 56 provide power directly to the multiple powered tools 54 by bypassing or eliminating altogether the central supply source rechargeable battery 16 or capacitor. An electronic switch may be necessary to act as a gatekeeper for shunting the appropriate power source to the appropriate tool. The central source 58 may also include a capacitor as a supplement to or substitute for the rechargeable battery 16. In the former situation, the rechargeable battery 16 can be interposed between the capacitor and the power generating source 56.

Quad-Powered is the name given all of applicant's devices that have the ability to receive a power charge from four different sources 56. Applicant has created a solution to the problem of people not having power for flashlights or other emergency preparedness devices when they need them most—pursuing powering low voltage electrical devices via four separate sources of energy to ensure the user is never caught in an emergency without being able to power up their device. Applicant's products can receive power from the following sources:

1) Battery—Applicant's devices will still be able to operate on conventional battery power. However, in a preferred implementation, it will only pull power from this source when others are depleted.
2) Self Power—Internal generators to convert rotary (crank, pull, push) action to power, or to utilize solar charging panels, to recharge internal rechargeable batteries to assure power to the device during brown/black outs or when electrical power is just not available.
3) DC Powered—This allows users to charge their emergency preparedness devices in their cars (e.g. from a 12V car connector). In case of an emergency in the car (i.e. fixing a flat) you don't have to worry about being without your flashlight
4) AC Powered—Will allow the device to be recharged conventionally without the extra effort of utilizing self power feature when regular electricity is available. This is to cater to users who will be using our flashlights on a daily basis to ensure their batteries do not run out.

Having described and illustrated the principles of the invention in a preferred embodiment thereof, it should be apparent that the invention can be modified in arrangement and detail without departing from such principles. We claim all modifications and variation coming within the spirit and scope of the invention.

What is claimed is:

1. A portable, powered multifunction tool comprising:
a light source enclosed within a housing;
a local power source comprising a rechargeable battery or capacitor enclosed within the housing and configured to power the light source; and
at least three supplemental power source interfaces coupled to the rechargeable battery, including a DC power interface, an AC power interface, and an electromechanical interface, each of the at least three supplemental power source interfaces configured to recharge the rechargeable battery.

2. The portable, powered multifunction tool of claim 1, further comprising a fourth supplemental power source interface coupled to the rechargeable battery including a dry cell battery enclosed within the housing configured to recharge the rechargeable battery.

3. The portable, powered multifunction tool of claim 2, wherein the fourth supplemental power source interface is further configured to only pull power from the dry cell battery when the local power source is depleted.

4. The portable, powered multifunction tool of claim 1, further comprising a fourth supplemental power source interface coupled to the rechargeable battery including solar cell disposed on the housing and configured to recharge the rechargeable battery.

5. The portable, powered multifunction tool of claim 1, further including at least another multifunction tool coupled to the rechargeable battery taken from the group consisting of a lantern, a siren, a flasher, a radio, and a cell phone charger.

6. The portable, powered multifunction tool of claim 1, further including a bypass circuit coupled to the supplemental power source interfaces for shunting power to the multifunction tool.

7. The portable, powered multifunction tool of claim 1, wherein the local power source includes both a rechargeable battery and a capacitor, wherein the battery is interposed between the capacitor and the supplemental power source interfaces.

* * * * *